United States Patent

[11] 3,605,023

[72] Inventor Arthur Jonathan Kline, Jr.
Scottsdale, Ariz.
[21] Appl. No. 849,216
[22] Filed Aug. 11, 1969
[45] Patented Sept. 14, 1971
[73] Assignee Motorola, Inc.
Franklin Park, Ill.

[54] FREQUENCY DIVIDER
7 Claims, 3 Drawing Figs.

[52] U.S. Cl. .... 328/25, 331/37, 331/51
[51] Int. Cl. .... H03b 19/00
[50] Field of Search .... 328/25, 30; 331/37, 42, 43, 51

[56] References Cited
UNITED STATES PATENTS

| | | | |
|---|---|---|---|
| 3,007,117 | 10/1961 | Cutler | 331/51 |
| 3,110,820 | 11/1963 | Panicello | 328/25 |
| 3,320,547 | 5/1967 | Standfurd et al. | 331/37 |

*Primary Examiner*—John S. Heyman
*Attorney*—Mueller & Aichele

ABSTRACT: A frequency divider is disclosed which comprises one divide-by-two divider or a plurality of cascaded divide-by-two dividers. The input of the divide-by-two divider or of the cascaded divide-by-two dividers is through a balanced modulator. The output of the divide-by-two divider or of the cascaded divide-by-two dividers which is the output of the disclosed frequency divider is fed back to the other input of the modulator.

INVENTOR.
Arthur Jonathan Kline Jr.

BY
Mueller, Aichele, & Rauner
ATTY'S.

FREQUENCY DIVIDER

BACKGROUND

This invention relates to frequency dividers.

Divide-by-two frequency dividers are known in which a fundamental wave is applied to one input of a balanced modulator and an output wave from the balanced modulator is fed back to the other input of the balanced modulator, usually through an amplifier, to produce a beat wave which is half the frequency of the fundamental wave. Such a frequency divider is stable in that it cannot produce an output wave if an input wave is not present and in that the frequency of the output if it is present at all will be the desired fraction of the input wave. If such a frequency divider is modified to provide division by a larger integer than 2, such a frequency divider will not start itself since the output wave with which the input wave is beat to produce the output wave is not present initially and must be supplied in some manner as by special starting equipment.

SUMMARY

According to the invention, one or more divide-by-two dividers are provided. Each divide-by-two divider comprises a balanced modulator and an amplifier. The wave to be divided by two is applied to an input of the balanced modulator, the output of the balanced modulator is applied to the amplifier and the output of the amplifier which is the output of the divide-by-two divider is fed to the other input of the modulator. The divide-by-two dividers may be cascaded by connecting the output of the amplifier of one divide-by-two divider to one input of the modulator of a successive divide-by-two divider. An additional modulator is provided. The wave to be divided is applied to one input of the additional modulator and the output of the additional modulator is applied to the input of a divide-by-two divider, or, if several divide-by-two dividers are cascaded, to the input of the first one of the cascaded divide-by-two dividers. The output of the divide-by-two, or, if several are cascaded, the output of the last of the cascaded divide-by-twos is connected to the other input of the additional modulator. The connection to the other input of the additional modulator is the output of the disclosed frequency divider. Such a frequency divider will divide a wave of any frequency in a large band of frequency, is self-starting, the size of its components are not critical, and the frequency divider has absolute stability in that the frequency of the output is a predetermined fraction of the frequency of the input as long as an input wave is applied to the frequency divider and in that the output wave ceases when the input wave ceases.

DESCRIPTION

Figure 1:
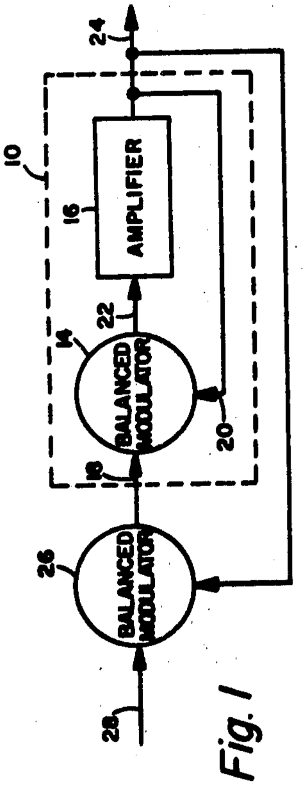
Figure 2:
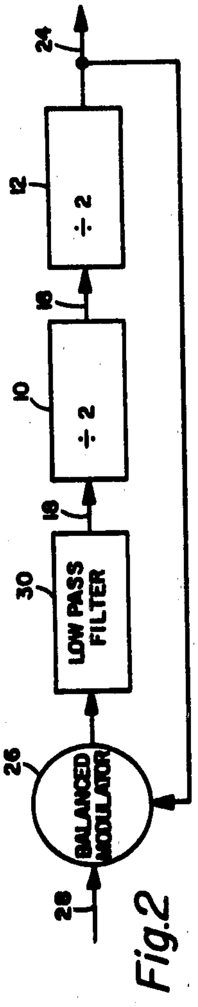
Figure 3:
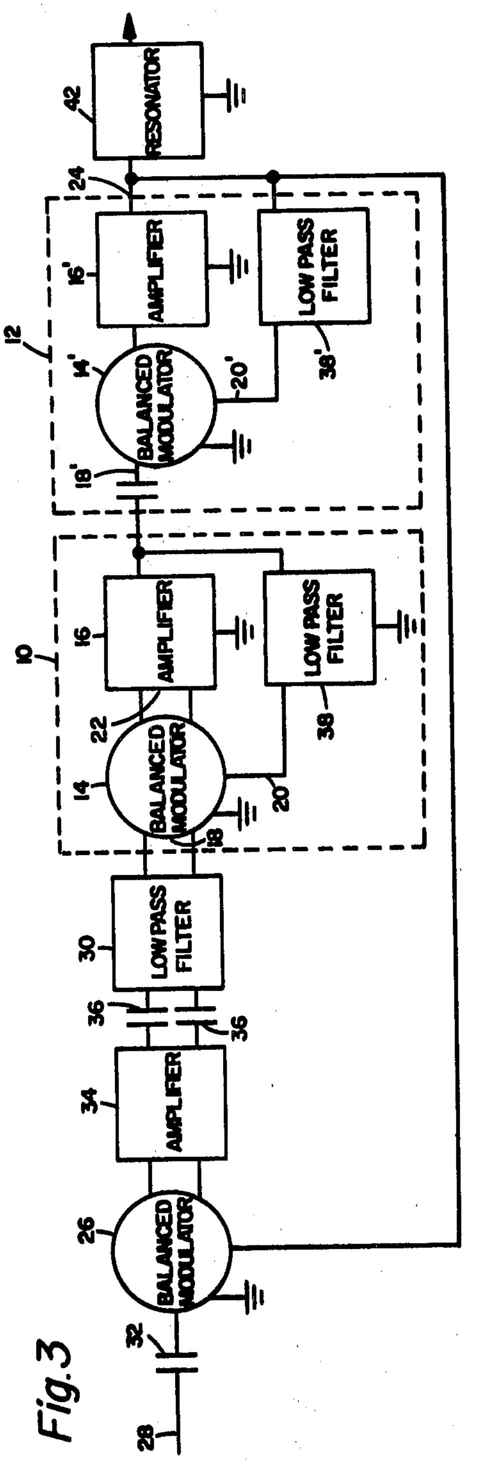

The invention will be better understood upon reading the following description in connection with the accompanying drawing in which:

FIGS. 1, 2 and 3 illustrate frequency dividers according to this invention.

Turning first to FIG. 1, it will be noted that the frequency divider shown includes a divide-by-two frequency divider (hereinafter a divide-by-two) 10. The divide-by-two 10 comprises a balanced modulator 14 and an amplifier 16. The balanced modulator 14 has two inputs 18 and 20 and one output 22. The output 22 of the balanced modulator 14 feeds the input of its respective amplifier 16 and the output of the amplifier 16 is fed back to one of the inputs 20 of its respective modulator 14. The output 24 of the divide-by-two 10 is fed back to an input terminal of an additional balanced modulator 26. The wave to be divided is applied to the other input 28 of the balanced modulator 26 and the output wave of the modulator 26 is applied to the input 18 of the divide-by-two 10. The final output of the divider of FIG. 1 appears at the output terminal 24 of the divide-by-two 10.

The operation of the circuit of FIG. 1 will be described first by describing the operation of the divide-by-two 10. Assuming that a wave $f_x$ is applied to the input terminal 18 of the balanced modulator 14. A predetermined fraction of the wave at this frequency $f_x$ appears at terminal 22 to be applied to the amplifier 16. By parametric pumping, a wave of $f_x/2$ appears at the output of the amplifier 16 and therefore at the other input 20 of the balanced modulator 14. Since $f_x$ and $f_x/2$ are applied to the two inputs of the modulator 14, its beat, which is equal to $f_x/2$ appears at the input of the amplifier 16, and this wave is amplified in the amplifier 16 and applied as $f_x/2$ at the output 24 of the divide-by-two 10.

The divider of FIG. 1 will divide the frequency applied at the terminal 28 by three. Let it be assumed that a wave of the frequency $f_i$ is applied to the terminal 28 in FIG. 1. At this moment when the frequency $f_i$ is applied at 28, the frequency at the input terminal 18 is still $f_i$, and there is no wave applied to the other input of the balanced modulator 26. That is, a predetermined fraction of the applied wave of the frequency $f_i$ will appear at the output of the balanced modulator 26 at a frequency $f_i$. By division of two, as explained above, the wave at 24 will be $f_i/2$ (or $f_x$ as in the above example). Therefore, the waves applied to the two inputs of the balanced modulator 26 are $f_i$ and $f_i/2$. The output of the balanced modulator is $f_i/2$, whereby due to division by two by the divide-by-two 10, the output at 24 becomes $f_i/4$ and the inputs of the balanced modulator 26 becomes $f_i$ and $f_i/4$ , whereby the output thereof is $3f_i/4$. Then the output at 24 becomes three-eighth $f_i$ and the output of the balanced modulator 26 becomes five-eighth $f_i$. The output at 24 becomes $5/16\ f_i$ and the output of the balanced modulator 26 becomes $11/16\ f_i$ while the output at 24 becomes $11/32 f_i$. It is noted that the frequency of the wave at output terminal 24 converges rapidly towards $f_i/3$. This happens very rapidly and is self-starting.

FIG. 2 differs from FIG. 1 in that a filter, shown at the low-pass filter 30, has been inserted between the balanced modulator 26 and the divide-by-two 10 and in that a second divide-by-two 12 is provided which is cascaded with the divide-by-two 10. The output of the divider of FIG. 2 is at 24 and this output is fed back to the other input of the balanced modulator 26. While a low-pass filter is used in FIG. 2, any filter that will accentuate the difference frequency output at the expense of the sum frequency output of the modulator 26 may be used.

The divider of FIG. 2 divides the wave of the frequency $f_i$ applied to the input terminal 28 by 5 in the following manner. When the wave $f_i$ is first applied to the terminal 28, a predetermined portion thereof arrives at the terminal 18 and by two successive divisions by two, $f_i/4$ appears at the other input terminal of the modulator 26, whereby the output of the modulator 26 is $\frac{3}{4} f_i$. Due to successive divisions by the divide-by-twos 10 and 12, $3/16\ f_i$ appears at the other input of the modulator 26. Now the frequency at 18 becomes $13/16\ f_i$ and the frequency at 24 becomes $13/64 f_i$. This causes a production of $51/64\ f_i$ at 18, which produces $51/256\ f_i$ at 24 whereby the frequency at 18 is $205/256\ f_i$ and the frequency at 24 is $205/1024 f_i$, which converges very rapidly into the final value of $4/5 f_i$ at 18 and $1/5 f_i$ at 24, the input at 28 always remaining at $f_i$. Therefore, the circuit of FIG. 1 to which $f_i$ is applied starts immediately and produces its divided by five output at the terminal 24.

FIG. 3 shows in more detail an embodiment of the divider of FIG. 2. In FIGS. 1, 2 and 3, similar elements have been given the same reference character, except that the internal element of the divide-by-two 12 has been given primed reference characters. The input wave $f_i$ is applied to the input terminal 28, which may be connected to an ungrounded input of the first balanced modulator 26 by way of a blocking capacitor 32. An amplifier 34 may be provided to amplify the output of the balanced modulator 26 and the output of the amplifier 34 may be applied to a low-pass filter 30 through blocking capacitor 36. The low-pass filter accentuates the difference frequency found in the output of the modulator 26 at the expense of the sum frequency. The output of the amplifier 16 may be fed back into the balanced modulator 18 through a low pass filter 38 which accentuates the wave of difference frequency that appears in the output of the modulator 14. Similarly, the low pass filter 38' accentuates in the feedback from the output 24 of the amplifier 16' the wave that is the difference frequency in the output of modulator 14', and a resonator 42 is connected to the terminal 24 to resonate at or near the frequency of the desired output wave, to select the desired output wave over the other wave components appearing at the output terminal 24. As none of the filters 30, 38 and 38' or the resonator 42 need be of the narrow band type, a wave $f_i$ anywhere in a broad-band of waves when applied to the input terminal 28 will be divided by the described frequency divider. As above, the frequency divider is self-starting, it divides absolutely, and the components thereof are not critical in value.

I claim:

1. A frequency divider comprising:
at least one divide-by-two having an input and an output terminal,
said divide-by-two comprising a respective first modulator having two input terminals and an output terminal and an amplifier,
the output terminal of said first modulator being connected to the input of said amplifier,
the input of said divide-by-two being the other input terminal of said modulator and the output of said divide-by-two being the output of said amplifier,
a connection of the output of said amplifier to the other input terminal of said first modulator,
a second modulator having two inputs and an output,
means for applying a wave whose frequency is to be divided to one input of said second modulator,
means for applying the output of said divide-by-two to the other input of said second modulator,
means to connect the output of said second modulator to the input of said divide-by-two
and means to take a wave of divided frequency from the output of said divide-by-two.

2. The invention as expressed in claim 1 in which said modulator is balanced.

3. A frequency divider comprising:
at least one divide-by-two having an input and an output terminal,
a modulator having two inputs and an output,
means for applying a wave whose frequency is to be divided to one input of said modulator,
means for applying the output of said divide-by-two to the other input of said modulator,
means to connect the output of said modulator to the input of said divide-by-two,
a plurality of divide-by-twos being cascaded, each divide-by-two comprising a respective amplifier and a respective modulator, each respective modulator having two inputs and an output, the output of each respective modulator being applied to its respective amplifier and the output of the respective amplifier being applied to one input of its respective modulator, the output of an amplifier being applied to the other input of the first-mentioned modulator.

4. The invention as expressed in claim 3 in which a filter is connected between the output of said first mentioned modulator and the input of said cascaded divide-by-twos.

5. The invention as expressed in claim 3 in which a filter and an amplifier are connected in cascade between the output of said first mentioned modulator and the input of said cascaded divide-by-twos.

6. The invention as expressed in claim 1 in which said divide-by-two includes a filter connected between said amplifier and said first modulator.

7. The invention as expressed in claim 6 in which each of said modulators is balanced.